(12) United States Patent
Flinta et al.

(10) Patent No.: US 8,737,216 B2
(45) Date of Patent: May 27, 2014

(54) MEASURING NETWORK PERFORMANCE WITH REFERENCE PACKET PROBING

(75) Inventors: Christofer Flinta, Stockholm (SE); Svante Ekelin, Vallentuna (SE); Bob Melander, Sigtuna (SE); Jan-Erik Mångs, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 668 days.

(21) Appl. No.: 12/595,565

(22) PCT Filed: Apr. 12, 2007

(86) PCT No.: PCT/SE2007/000345
§ 371 (c)(1),
(2), (4) Date: Mar. 26, 2010

(87) PCT Pub. No.: WO2008/127154
PCT Pub. Date: Oct. 23, 2008

(65) Prior Publication Data
US 2011/0317568 A1   Dec. 29, 2011

(51) Int. Cl.
*H04L 12/24* (2006.01)
(52) U.S. Cl.
USPC .......................................................... 370/232
(58) Field of Classification Search
USPC ........... 370/231, 232, 241, 252, 389; 709/232
See application file for complete search history.

(56) References Cited

U.S. PATENT DOCUMENTS

| | | | | |
|---|---|---|---|---|
| 6,868,094 B1* | 3/2005 | Bordonaro et al. | ........... | 370/516 |
| 7,453,820 B2* | 11/2008 | Tuinstra | ........................ | 370/252 |
| 7,948,906 B1* | 5/2011 | Patel et al. | .................... | 370/252 |
| 7,961,637 B2* | 6/2011 | McBeath | ....................... | 370/252 |
| 2001/0050903 A1* | 12/2001 | Vanlint | ........................ | 370/252 |
| 2006/0034339 A1 | 2/2006 | Liu | | |
| 2009/0190493 A1* | 7/2009 | Nakata | ........................... | 370/253 |

OTHER PUBLICATIONS

S. Ekelin and M. Nilsson, "Continuous monitoring of available bandwidth over a network path", 2nd Swedish National Computer Networking Workshop, Karlstad, Sweden, Nov. 23-24, 2004.
S. Ekelin; M. Nilsson, E. Hartikainen, A. Johnsson, J.-E. Mangs, B. Melander and M. Bjorkman, "Real-time measurement of end-to-end available bandwidth using Kalman filtering," in Proc. 10th IEEE/IFIP Network Operations and Management Symposium 2006.
E. Hartikainen and S. Ekelin, "Tuning the Temporal Characteristics of a Kalman-Filter Method for End-to-End Bandwidth Estimation," in Proc. 4th IEEE/IFIP Workshop on End-to-End Monitoring Techniques and Services, 2006.
E. Hartikainen and S. Ekelin, "Enhanced Network-State Estimation using Change Detection," in Proc. 1st IEEE LeN Workshop on Network Measurements, 2006.

\* cited by examiner

*Primary Examiner* — Paul H Masur

(57) ABSTRACT

A method of measuring network performance is disclosed. A payload packet is transmitted from a sending node to a receiving node via a communication network. A reference packet is transmitted to the receiving node in connection with sending of the payload packet. Receive information related to the payload packet and to the reference packet is generated, at the receiving node. Send information related to the payload packet and to the reference packet is received, by the receiving node. Network performance is estimated by utilizing the send and receive information.

17 Claims, 5 Drawing Sheets

MEASURING NETWORK PERFORMANCE WITH REFERENCE PACKET PROBING

TECHNICAL FIELD

The present invention relates to methods and arrangements for measuring communication network performance.

BACKGROUND

Measurement of network characteristics can be performed using methods which include active probing of the network, i.e. injecting dedicated probe packets for the sole purpose of the measurement method. One example is disclosed in the U.S. Pat. No. 6,868,094 wherein an IP performance monitoring method is shown. In the US patent a timing probe data packet containing a send time stamp is sent over the network from a sender to a receiver. A receive time stamp is written into the probe packet at the receiver. The probe packet is echoed by the receiver and the probe packets sender performs an analysis based upon the send stamp and receive stamp. Another example is the BART method for available bandwidth estimation, developed at Ericsson AB. Aspects of BART has been published at several conferences such as:

[1] S. Ekelin and M. Nilsson, "Continuous monitoring of available bandwidth over a network path", $2^{nd}$ Swedish National Computer Networking Workshop, Karlstad, Sweden, Nov. 23-24, 2004.

[2] S. Ekelin, M. Nilsson, E. Hartikainen, A. Johnsson, J.-E. Mångs, B. Melander and M. Björkman, "Real-time measurement of end-to-end available bandwidth using Kalman filtering," in *Proc. 10th IEEE/IFIP Network Operations and Management Symposium, 2006*.

[3] E. Hartikainen and S. Ekelin, "Tuning the Temporal Characteristics of a Kalman-Filter Method for End-to-End Bandwidth Estimation," in *Proc. 4th IEEE/IFIP Workshop on End-to-End Monitoring Techniques and Services, 2006*.

[4] E. Hartikainen and S. Ekelin, "Enhanced Network-State Estimation using Change Detection," in *Proc. 1st IEEE LCN Workshop on Network Measurements, 2006*.

In an active probing method, each probing packet receives a time stamp as it is sent from the sending node. When reaching the receiving node it is time-stamped again, and the time stamps are fed into an algorithm in order to calculate an estimate of the characteristics metrics. When estimating available bandwidth, also the sizes of the probe packets are needed by the algorithm.

The probing packets are normally sent in pairs or in packet trains. The number of packets in a train may vary according the probing method. However, a train must consist of at least two packets. BART is essentially a packet-pair method, and in the cases where probe packet trains of length N>2 are used, the train can essentially be seen as a sequence of N−1 probe packet pairs, where all the interior packets double as being the first in one pair and the second in another.

The time interval between sent probe packets is selected by the probing algorithm in order to achieve a specific probing load on the network path. This time interval is related to the probe packet size; a smaller time interval between packets with a given packet size will give a higher probing load.

One reason for using pairs (or trains) as opposed to sending isolated probe packets is that the need for synchronization between sender and receiver is eliminated.

In the basic version of BART, no feedback from receiver to sender is assumed. The algorithm can be considered to be running at the receiver, and all input needed must then be accessible at the receiver.

Probing can be used in different ways. One possibility is probing end-to-end, i.e. from one sending host to one receiving host. Another scenario is probing edge-to-edge, i.e. from one aggregating node to another aggregating node.

One problem is that active probing increases the traffic load on the network, since probe packets normally don't carry any payload. If the use of probing-based measurement methods starts to grow, this could cause significant volumes of extra network traffic.

SUMMARY

The present invention relates to a problem with unwanted increased traffic load on a communication network caused by probing during measurement of network characteristic.

The problem is solved by the invention by sending a payload packet and a reference packet from a sending to a receiving side. Send information related to both the payload and the reference packet is received at the receiving side. Receive information for the packets are generated at the receiving side. The send and receive information is used to estimate network performance. The information comprises values necessary for the estimation algorithm at hand. In some embodiments this could be time stamp, time stamp differences, payload packet size and/or payload packet identifier.

In more detail, the solution to the problems is a method to measure network performance, comprising the following steps:

A payload packet is transmitted from a sending node to a receiving node via a communication network.

A reference packet is transmitted to the receiving node in connection with sending of the payload packet.

Receive information, related to a receive time stamp for the payload packet and to a receive time stamp for the reference packet, is generated at the receiving node.

Send information related to the payload packet and to the reference packet is received by the receiving node.

Network performance is estimated, by utilization of send and receives information.

A purpose with the invention is to decrease the load on the network caused by bandwidth consuming probe packets sent over the network during network characteristic measurement. This purpose and others are achieved by methods, arrangements, nodes, systems and articles of manufacture.

A main advantage of the invention is that the probing overhead is significantly reduced, as compared to standard probing methods. The bulk of the traffic needed for this probing method is thus constituted by the payload packets, which would anyway need to be transmitted.

Examples of usage are:

Adaptive applications where the sending rate is adapted to the available bandwidth, e.g. IPTV.

Base stations interconnected via Internet access in future RAN, detecting available bandwidth and using CAC for telephony services.

Measuring bandwidth between enterprise sites in order to shape traffic from different applications.

Verification of SLA between customer and network provider

The invention will now be described more in detail with the aid of preferred embodiments in connection with the enclosed drawings.

DETAILED DESCRIPTION

Figure 1:
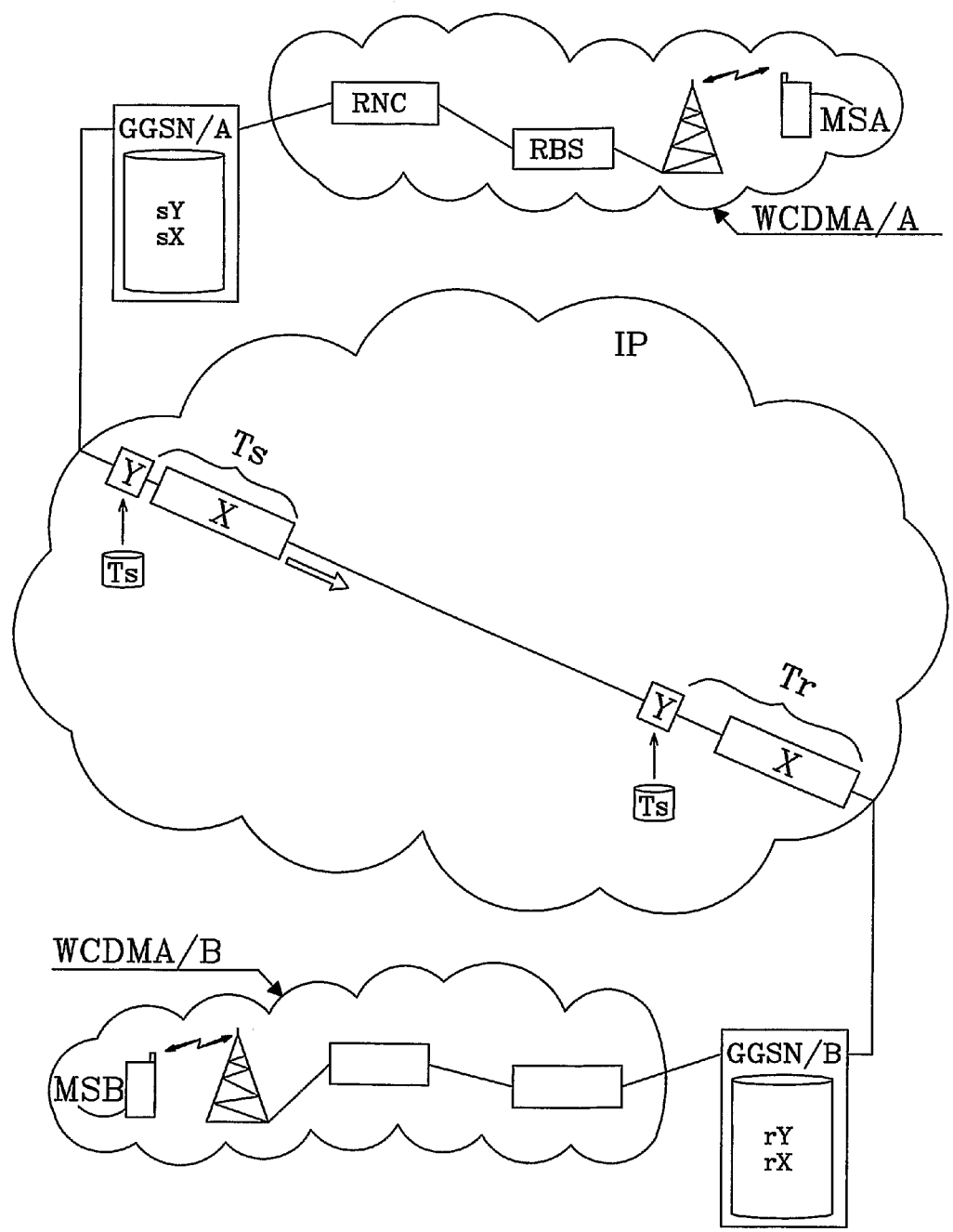
FIG. 1 discloses a block schematic illustration of a payload packet and a reference packet sent between WCDMA networks over an IP network. A send time difference between the packets is sent in the reference packet to the receiving side in this embodiment.

FIG. 1 discloses a system that can be used to put a first embodiment of the invention into practice. In FIG. 1 an Internet Protocol IP network system is shown in which voice or other time-sensitive data are sent in payload parts of packets from a server to a client or vice versa. Some examples of data are real-time image and voice, still image and text. Two access networks WCDMA/A, WCDMA/B of the type Wideband Code Division Multiple Access mobile communication systems are shown in FIG. 1. A mobile terminal/subscriber MSA is located in the WCDMA/A network and communicates via a Radio Base Station RBS. Packets from MSA are hereby sent from the RBS to a Radio Network Controller RNC in the WCDMA/A. The RNC is the main element in a Radio Network Subsystem that controls the use and the reliability of the radio resources. Packets arriving from terminal MSA are forwarded from the RNC to a Gateway GPRS Support Node GGSN/A in packet domain. The GGSN/A supports the edge routing function of the GPRS network. GGSN/A performs the task of an IP router to external packet data networks. In this example, as indicated in FIG. 1, packets are sent from GGSN/A via the IP network to GGSN/B. A mobile terminal/subscriber MSB is located within the WCDMA/B network that is attached to the IP network via a Gateway GPRS Support Node GGSN/B. In FIG. 1 packets X and Y can be seen in the IP network. In the example that will be further explained below, information such as data and/or voice from terminal MSA is sent as a payload packet X from GGSN/A, via the IP network and via the GGSN/B to terminal MSB. Send time stamps sX and sY representing send time of day may be generated in the GGSN/A out of the packets sent from GGSN/A. In the same way receive times stamp rX and rY representing receive time of day may be generated in the GGSN/B from the packets when received to GGSN/B.

A method of measuring network performance according to the first embodiment will now be explained together with FIG. 1. The method comprises the following steps:

- The payload packet X aimed for terminal MSB is sent from terminal MSA to GGSN/A. The packet comprises a header section and a payload section. While the header section comprises information such as source and destination addresses, the payload section comprises the actual data information such as e.g. speech.
- The payload packets X is transmitted from the sending node GGSN/A via the Internet Protocol network IP to the receiving node GGSN/B.
- The send time stamp sX for the packet X is generated and stored in the sending node GGSN/A. A send time stamp indicates a packet's send time of day from the GGSN/A.
- The reference packet Y is prepared to be sent from the sending node GGSN/A to the receiving node GGSN/B. Send information is hereby calculated, that corresponds to a sending time difference Ts between the send time stamp sX for the payload packet X and the send time stamp sY representing the intended send time of the reference packet Y. The send information Ts (=sY−sX) is placed in a payload section of the reference packet Y. This "storage" is shown in FIG. 1 with an arrow pointing from a database symbol towards the reference packet.
- The reference packet Y is transmitted at the intended send time from the sending node GGSN/A via the Internet Protocol network IP to the receiving node GGSN/B. To be noted is that FIG. 1 is schematically drawn and that the reference sign "Ts" is shown in FIG. 1 as the time difference between the payload packet X and the reference packet Y while the packets are in the IP network close to the sending side while in reality "Ts" is the time difference between X and Y at the moment when the reference packet Y is sent from GGSN/A.
- The payload packet X and the reference packet Y are received, one by one, from the sending node GGSN/A to the receiving node GGSN/B.
- The packets X and Y are receive time stamped at the receiving side. A receive time stamp indicates a packet's receive time of day to the GGSN/B. The packets X and Y are time stamped and consequently a receive time stamp rX and rY for each packet is generated and stored in the GGSN/B.
- The time difference between the selected received packets X and Y i.e. the time difference Tr=rY−rX is calculated in the GGSN/B. The send time difference between the packets X and Y i.e. the time difference Ts=sY−sX received in the reference packet Y is also stored in the GGSN/B.
- The time differences Tr and Ts are handled in an algorithm to create a BART estimate of available bandwidth. The BART method for available bandwidth estimation is well known to those skilled in the art. Aspects of BART have been published at several conferences, see for example those mention in the BACKGROUND part of this application. To be observed is that the BART method is just one example and not the only method that can be used to estimate network performance by using the invention.

To be noted is that instead of an IP network, other type of networks may be used such as for example an Asynchronous Transfer Mode ATM network.

Figure 2:
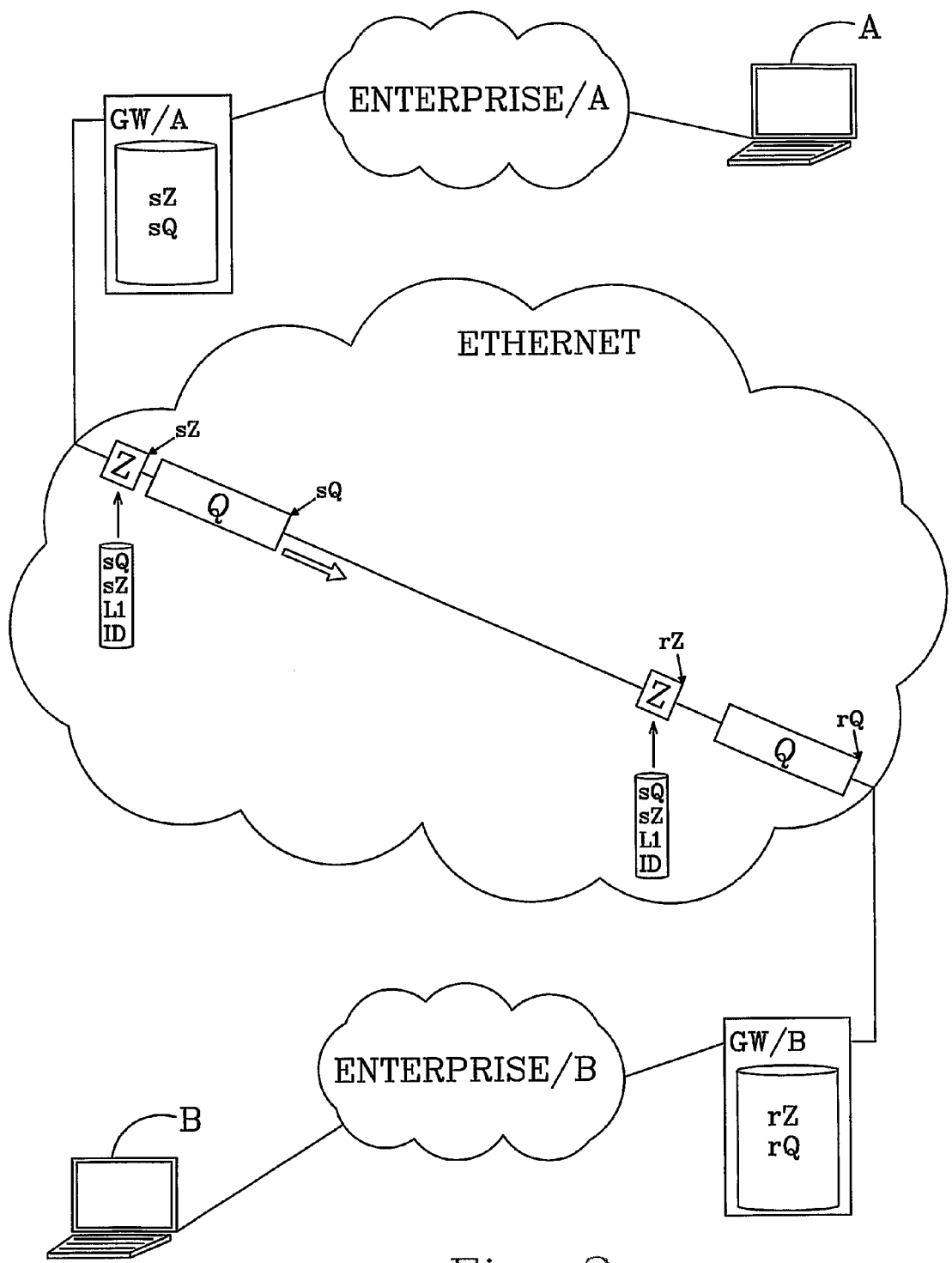
FIG. 2 discloses a block schematic illustration of data packets sent between Enterprise networks over an Ethernet network. Send time stamps are sent together with payload packet identification and length in the reference packet to the receiving side in this embodiment.

FIG. 2 discloses a second embodiment of the invention. In FIG. 2 is shown two Enterprise networks ENTERPRISE/A/B that communicates via an Ethernet based network. In the computer industry, the term Enterprise is often used to describe any large organization that utilizes computers. An intranet, for example, is an example of an enterprise computing system. Ethernet uses a bus or star topology and currently supports data transfer rates from 10 Mbps to 10 Gbps. The Ethernet specification served as the basis for the IEEE 802.3, which specifies the physical and lower software layers.

In FIG. 2 a terminal/subscriber A is attached to ENTERPRISE/A. Subscriber A communicates via a GateWay node GW/A with the ETHERNET based network. In the same way, a terminal/subscriber B is attached to ENTERPRISE/B that communicates via a GateWay node GW/B with the ETHERNET. In FIG. 2 a payload packet Q can be seen in the ETHERNET network. In this embodiment, that will be further explained below, information such as data from terminal A is sent in the payload packets Q from GW/A, via the ETHERNET network and via the GW/B to terminal B. Send time stamps sQ and sZ representing the packet's send time of day may be generated in the GW/A out of packets sent from GW/A, and then stored in the GW/A. In the same way receive time stamps rQ and rZ representing the packet's receive time of day may be generated in the GW/B from the packet received to GW/B, in a database in the GW/B.

A method of measuring network performance according to the second embodiment of the invention will now be explained together with FIG. 2. The method comprises the following steps:

- The payload packet Q aimed for terminal B is sent from terminal A to GW/A. The packet comprises a header section and a payload section. The payload section comprises the actual data information such as e.g. speech.
- The payload packet Q is transmitted from the sending node GW/A via the ETHERNET network to the receiving node GW/B.
- The send time stamp sQ for the packet Q is generated and stored in the sending node GW/A.
- An identifier ID of the payload packet Q and a packet length value i.e. the size L1 of the payload packet Q is detected/calculated and stored in the sending node GW/A. In this embodiment, an estimation of available bandwidth is desired and consequently the size of the packet is needed in an estimation algorithm. Alternatively, the packet size can be detected or calculated at the receiving side. A payload packet's identification can be created for example by calculating a hash sum for the packet. The identification can be used at the receiving side to detect loss of a packet after searching without finding a payload packet with identical hash sum as the hash sum received in the reference packet.
- The reference packet Z is prepared to be sent from the sending node GW/A to the receiving node GW/B. Send information which in this example is the send time stamp sQ for the payload packet Q and the send time stamp sZ i.e. the intended send time of the reference packet Z, is placed in a payload section of the reference packet Z This "storage" is shown in FIG. 1 with an arrow pointing from a database symbol towards the reference packet. In this example, in addition to the send time stamps sQ and sZ, also the packet's length value L1 and the identifier ID are placed in the payload section of the reference packet Z.
- The reference packet Z is transmitted at the intended send time from the sending node GW/A via the ETHERNET network to the receiving node GW/B.
- The payload packet Q and the reference packet Z are received by the receiving node GGSN/B from the sending node GW/A.
- The packets Q and Z are receive time stamped at the receiving side. The packets Q and Z are time stamped and consequently a receive time stamp rQ and rZ for each packet is generated and stored in the GW/B.
- The send and receive time stamps sQ, sZ, rQ and rZ are handled in an algorithm to create a BART estimate of available bandwidth.

In this example also the packet length value L1 of the payload packet Q was sent from the sending side to the receiving side since an estimation of available bandwidth is desired and consequently the sizes of the packets are needed in an estimation algorithm and must be forwarded in the reference packet Z. As an alternative, the size of the packet L1 can instead be detected/calculated at the receiving side. Also the identifier ID was sent over in this example. This can be very useful in case of loss of the packet Q, or in case of packet reordering.

Figure 3:
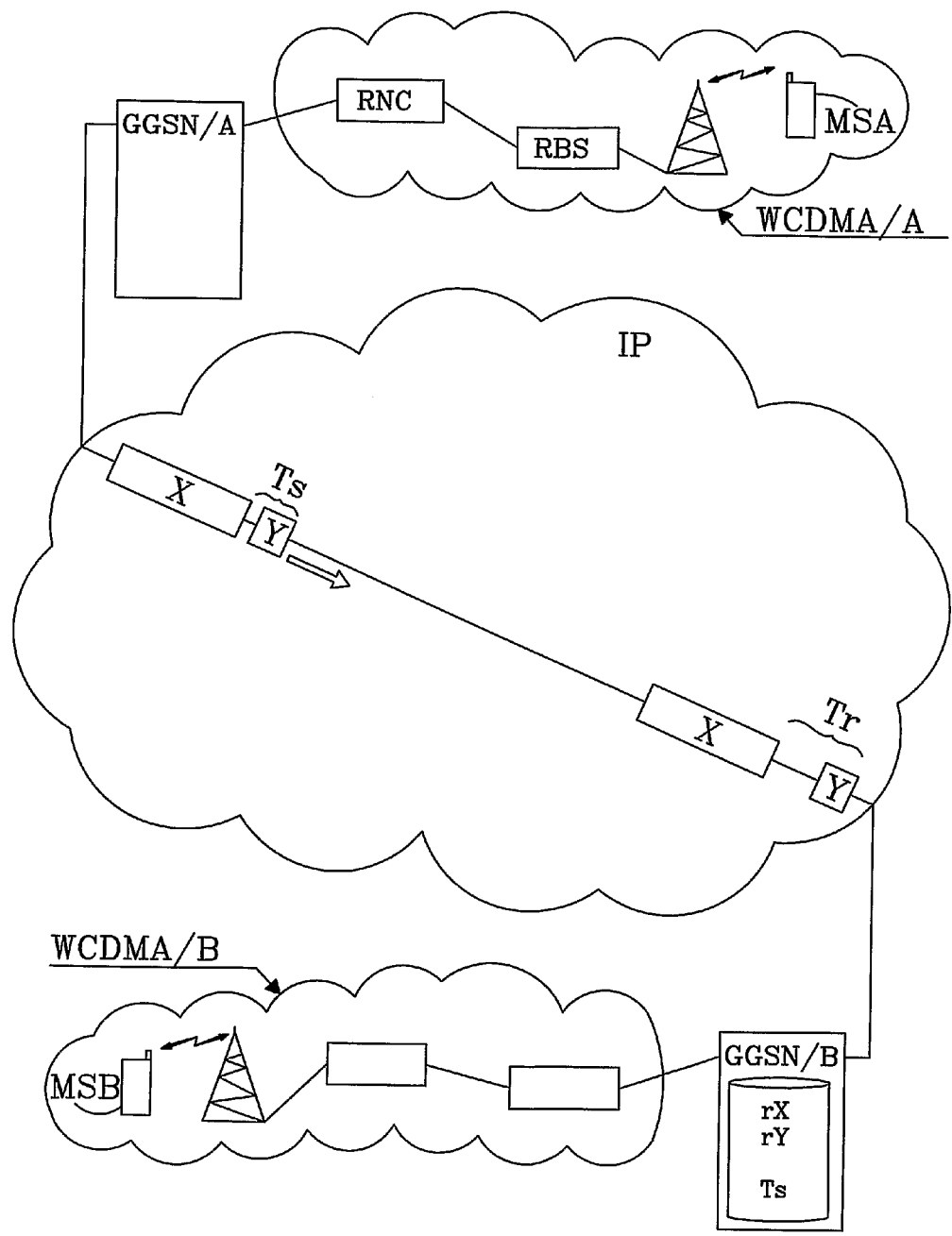
FIG. 3 discloses a block schematic illustration of a payload packet and a reference packet sent between WCDMA networks over an IP network. In this embodiment the payload packet is sent subsequently to the reference packet. No send information is sent in the reference packet to the receiving side in this embodiment.

A method of measuring network performance according to a third embodiment will now be explained together with FIG. 3. The system in FIG. 3 is the same as the system in FIG. 1 and the different elements, packets, time stamps etc. are by that already considered explained. A pre-requisite for this embodiment is that reference packets and payload packets by default are sent with the same delay time Ts between the packets, and that the delay is known by and stored in the receiving node GGSN/B. In this example the relative order of the packets in a packet pair is reversed. The method comprises the following steps:

- The payload packet X aimed for terminal MSB is sent from terminal MSA to GGSN/A.
- The reference packet Y is sent from the sending node GGSN/A via the Internet Protocol network IP to the receiving node GGSN/B. In this embodiment the payload section of the reference packet is empty and comprises no Send information.
- The payload packets X is transmitted from the sending node GGSN/A to the receiving node GGSN/B. The payload packet is sent the pre-defined time Ts after the reference packet.
- The reference packet Y and the payload packet X is received, one by one, from the sending node GGSN/A to the receiving node GGSN/B.
- The packets Y and X are receive time stamped at the receiving side. A receive time stamp indicates a packet's receive time of day to the GGSN/B. The packets Y and X are time stamped and consequently a receive time stamp rY and rX for each packet is generated and stored in the GGSN/B.
- The time difference between the selected received packets Y and X i.e. the time difference Tr=rX−rY is calculated in the GGSN/B. The send time difference between the packets X and Y i.e. the time difference Ts=sX−sY is already stored in the GGSN/B.
- Like in the first embodiment, the time differences Tr and Ts are handled in an algorithm to create a BART estimate of available bandwidth.

This embodiment has the advantage that the reference packet is even less bandwidth consuming than in the previous embodiment.

Figure 4:
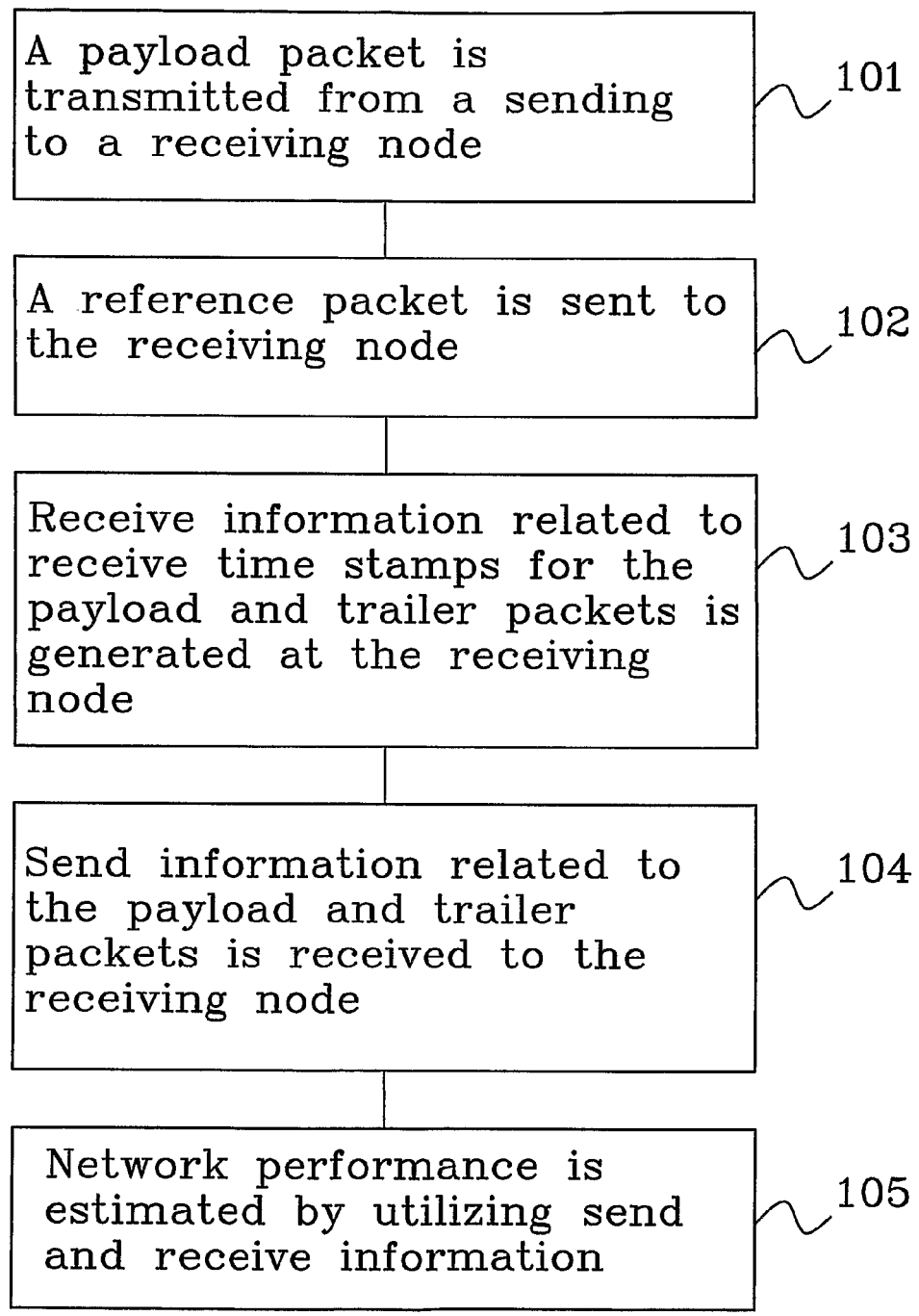
FIG. 4 discloses a flow chart illustrating some essential method steps of the invention.

FIG. 4 discloses a flow chart in which some of the more important steps of the invention are shown. The flowchart is to be read together with the earlier shown figures. The flowchart comprises the following steps:

- A payload packet (X; Q;) is transmitted from a sending node (GGSN/A; GW/A) via a communication network (IP; ETHERNET) to a receiving node (GGSN/B; GW/B). This step is disclosed in FIG. 4 with a block 101.
- A reference packet (Y; Z) is transmitted to the receiving node (GGSN/B; GW/B). This step is disclosed in FIG. 4 with a block 102.
- Receive information (Tr; rZ, rQ) related to a receive time stamp (rX, rQ) for the payload packet and a receive time stamp (rY, rZ) for the reference packet, is generated at the receiving node (GGSN/B; GW/B). This step is disclosed in FIG. 4 with a block 103.
- Send information (Ts; sZ, sQ) related to the payload packet and the reference packet is received to the receiving node (GGSN/B; GW/B). The send information can be a default value stored in the receiving node or it can be received from the reference packet. This step is disclosed in FIG. 4 with a block 104.

Network performance is estimated by utilizing the send and receive information (Ts, Tr; sZ, sQ, rZ. rQ). This step is disclosed in FIG. 4 with a block 105.

Figure 5:
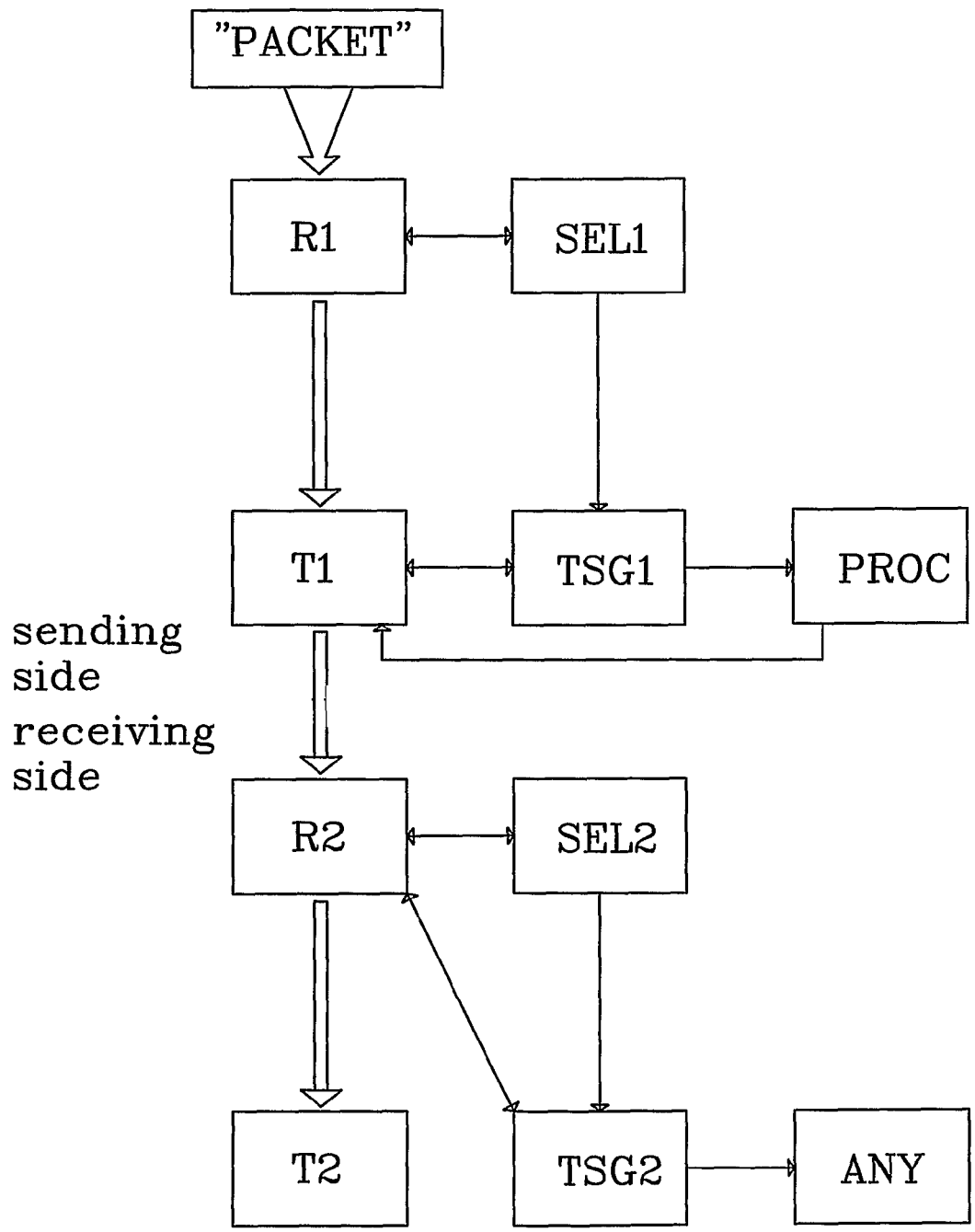
FIG. 5 schematically discloses a system that can be used to put the invention into practice.

An example of a system used to put the invention into practice is schematically shown in FIG. 5. The block schematic constellation corresponds to the ones disclosed in FIGS. 1-3 but is by no means limited to these examples. FIG. 5 discloses a packet receiver R1 and a packet transmitter T1 on a sending side. A selector SEL1 decides which packets are of interest to further observe. SEL1 is connected to a Time Stamp (and potentially Packet ID & Packet Length) Generator TSG1 on the sending side. The TSG1 stores a send time stamp from a selected packet and inputs send information into a reference packet before sending the reference packet from T1. Alternatively the TSG1 send the send time stamp together with a value representing intended send time for the reference packet, to a processor unit PROC which handles received information and forward into the reference packet before sending the reference packet from T1. When receiving packets from the sending side to the receiving side, a receiver R2 forwards packets to a transmitter on the receiving side. A selector SEL2 decides which packets are of interest to further observe. SEL2 is connected to a Time Stamp (and potentially packet ID and/or packet size) Generator TSG2 on the receiving side. The TSG2 forwards receive time stamps and potentially identifications and/or packet size from selected packets to an analyzing unit ANY. As an alternative, instead of receiving the send information in the reference packet, this can be default information stored in for example the ANY. A prerequisite is that the payload and reference packets are sent with a time in-between corresponding to the default value. To obtain network characteristics, the ANY handles received send and receive information.

Items are shown in the figures as individual elements. In actual implementations of the invention however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multifunction hardware. Processing functions may be implemented using a programmed microprocessor or general-purpose computer.

The invention is in other words not limited to the above described and in the drawings shown embodiments but can be modified within the scope of the enclosed claims.

The invention claimed is:

1. A method of measuring network performance, comprising the following steps:
    transmitting a payload packet from a sending node to a receiving node via a communication network, wherein the payload packet includes message content related to traffic data;
    transmitting a reference packet comprising an identifier of the payload packet, to the receiving node in connection with sending of the payload packet, wherein the reference packet does not include any message content related to traffic data;
    generating receive information related to the payload packet and to the reference packet, at the receiving node;
    receiving send information related to the payload packet and to the reference packet, by the receiving node;
    estimating network performance by utilizing the send and receive information.

2. The method of measuring network performance according to claim 1 wherein the reference packet, comprises the send information related to the payload packet and to the reference packet.

3. The method of measuring network performance according to claim 2 wherein the reference packet comprises a sending time difference between a send time stamp for the payload packet and a send time stamp for the reference packet.

4. The method of measuring network performance according to claim 2 wherein the reference packet comprises a send time stamp for the payload packet and a send time stamp for the reference packet.

5. The method of measuring network performance according to claim 1 wherein the send information related to the payload packet and to the reference packet is predefined information received to the receiving node.

6. The method of measuring network performance according to claim 1 wherein a size of the reference packet is essentially smaller than a size of the payload packet.

7. The method of measuring network performance according to claim 1 wherein the payload packet is sent subsequently to the reference packet.

8. The method of measuring network performance according to claim 1 wherein the reference packet is sent subsequently to the payload packet.

9. An arrangement to measure network performance, comprising:
    a first processor configured to transmit a payload packet from a sending node to a receiving node via a communication network, wherein the payload packet includes message content related to traffic data;
    the first processor further configured to transmit a reference packet comprising an identifier of the payload packet, to the receiving node in connection with sending of the payload packet, wherein the reference packet does not include any message content related to traffic data;
    at the receiving node, a second processor configured to generate receive information related to the payload packet and to the reference packet;

at the receiving node, the second processor further configured to receive send information related to the payload packet and to the reference packet;

the first processor further configured to estimate network performance by utilizing the send and receive information.

10. The arrangement to measure network performance according to claim 9 wherein the reference packet, comprises the send information related to the payload packet and to the reference packet.

11. The arrangement to measure network performance according to claim 10 wherein the reference packet comprises a sending time difference between a send time stamp for the payload packet and a send time stamp for the reference packet.

12. The arrangement to measure network performance according to claim 10 wherein the reference packet comprises a send time stamp for the payload packet and a send time stamp for the reference packet.

13. The arrangement to measure network performance according to claim 9 wherein the send information related to the payload packet and to the reference packet is predefined information received to the receiving node.

14. The arrangement to measure network performance according to claim 9 wherein a size of the reference packet is essentially smaller than a size of the payload packet.

15. The arrangement to measure network performance according to claim 9 wherein the payload packet is sent subsequently to the reference packet.

16. The arrangement to measure network performance according to claim 9 wherein the reference packet is sent subsequently to the payload packet.

17. A node for measuring network performance, comprising:

a processor configured to receive a payload packet via a communication network, wherein the payload packet includes message content related to traffic data;

the processor further configured to receive a reference packet comprising an identifier of the payload packet, in connection with the receiving of the payload packet, wherein the reference packet does not include any message content related to traffic data;

the processor further configured to generate receive information related to the payload packet and to the reference packet;

the processor further configured to receive send information related to the payload packet and to the reference packet;

the processor further configured to estimate network performance by utilizing the send and receive information.

\* \* \* \* \*